United States Patent [19]

Kutin

[11] Patent Number: 5,421,729
[45] Date of Patent: Jun. 6, 1995

[54] COLOR-CODED CATALOG AND SALES METHOD

[75] Inventor: Stan Kutin, Libertyville, Ill.

[73] Assignee: S.K. Enterprises, Elk Grove Village, Ill.

[21] Appl. No.: 156,288

[22] Filed: Nov. 22, 1993

[51] Int. Cl.6 .............................................. G09B 19/18
[52] U.S. Cl. ...................................... 434/109; 40/360
[58] Field of Search ....................... 434/107, 109, 367; 40/359, 360; 283/56

[56] References Cited

U.S. PATENT DOCUMENTS

| | | | |
|---|---|---|---|
| 1,342,520 | 6/1920 | Wright. | |
| 2,883,765 | 4/1959 | Blaine. | |
| 3,744,150 | 7/1973 | Folson. | |
| 4,204,639 | 5/1980 | Barber et al. | 40/359 X |
| 4,231,168 | 11/1980 | Nippel. | |
| 4,472,146 | 9/1984 | Weissbrod | 434/365 |
| 4,533,328 | 8/1985 | McDaniel | 434/94 |
| 4,846,691 | 7/1989 | Acosta | 434/259 |
| 5,000,446 | 3/1991 | Sarno | 272/118 |
| 5,018,976 | 5/1991 | Kuyath | 434/207 |
| 5,100,621 | 3/1992 | Berke et al. | 422/61 |
| 5,197,764 | 3/1993 | Hicinbothem et al. | 40/359 X |

OTHER PUBLICATIONS

Shami, Farouk, "Sunglitz; New Method of Lightening and Permanently Brightening Hair With the Use of Non-Oxidizing Pigments," 1988; pp. 8, 9, 12, and 13.

Primary Examiner—Robert P. Swiatek
Attorney, Agent, or Firm—Welsh & Katz, Ltd.

[57] ABSTRACT

A color-coded system of training illiterate, mentally handicapped or dyslexic individuals in the accurate ordering process which includes specifying colors designating particular items and the item bearing a particular color. Color-coded visual indicators such as catalog pages may be used to teach the individual to associate the color with the item and thereby simplify identification of the items to be ordered.

9 Claims, 2 Drawing Sheets

COLOR-CODED CATALOG AND SALES METHOD

BACKGROUND OF THE INVENTION

The present invention relates to methods of vocational sales training, and specifically to a method for training individuals in taking orders and making orders for parts which individuals may be illiterate, mentally handicapped or dyslexic, or who do not speak or read a specified language.

In the industrialized world, current labor force demographics are such that jobs requiring little or no skill are increasingly filled by individuals with minimal educational background, or alternately, by recent immigrants with negligible ability to read and/or speak the home country's language. In addition, there is an increasing awareness on the part of businesses as to the capabilities of mentally handicapped and dyslexic individuals to perform relatively simple jobs.

Consequently, as more illiterate, immigrant and/or mentally handicapped individuals are hired, businesses must increasingly address the problem of training such workers to be efficient and productive members of the organization.

Aside from training such workers in the basic skills of a particular job, a significant consideration in any such training program is that of accuracy—the employee should be trained so as to be accurate when ordering parts.

Accordingly, in order to properly train these types of workers, training personnel must often have skills in more than one language, and this requirement may also lead to difficulties in obtaining adequate training staff. These sorts of labor problems are prevalent in fields such as sales and purchasing.

In the sales field, it is important that employees understand the proper generic part or tool being ordered or supplied. It has often been difficult to convey these concepts to the kinds of workers identified above.

Thus, there is a need for a method of training unskilled, handicapped, dyslexic, and/or illiterate employees to accurately order parts, tools and the like without requiring substantial expenditures for training overhead.

SUMMARY OF THE INVENTION

Accordingly, the present method of training employs a color-coded system in which specific colors are used to designate generic items. Color-coded visual indicators such as catalog entries may be used to teach the individual to associate a particular color with the item or item grade, and to remind the individual of such association during the ordering or other process requiring identification of the item or item grade.

More specifically, in the case of a parts catalog, each one of a plurality of generic items such as mechanical carbon, tools, or the like is marked in a specific color or is packaged in a colored container. A visual indicator, such as a catalog page, is provided in which the catalog page or portion of a page is in that specific color. Also indicated on the catalog is a diagrammatic representation of the generic item, with at least the item depicted being in the same color. The worker carries the catalog with him for easy reference while ordering and to reinforce his training and insure the ordering of the proper item for a particular use. The catalog pages may be arranged in a particular order corresponding to size or other features of the item. Although each catalog page may contain written information about the specific item, the principal features of the catalog page are its color, the diagrammatic representations of the item by and the identification of individual items by part number or other code, so that illiterate, dyslexic, or mentally handicapped individuals may readily understand and order the proper item.

DESCRIPTION OF THE PREFERRED EMBODIMENT

Figure 1:
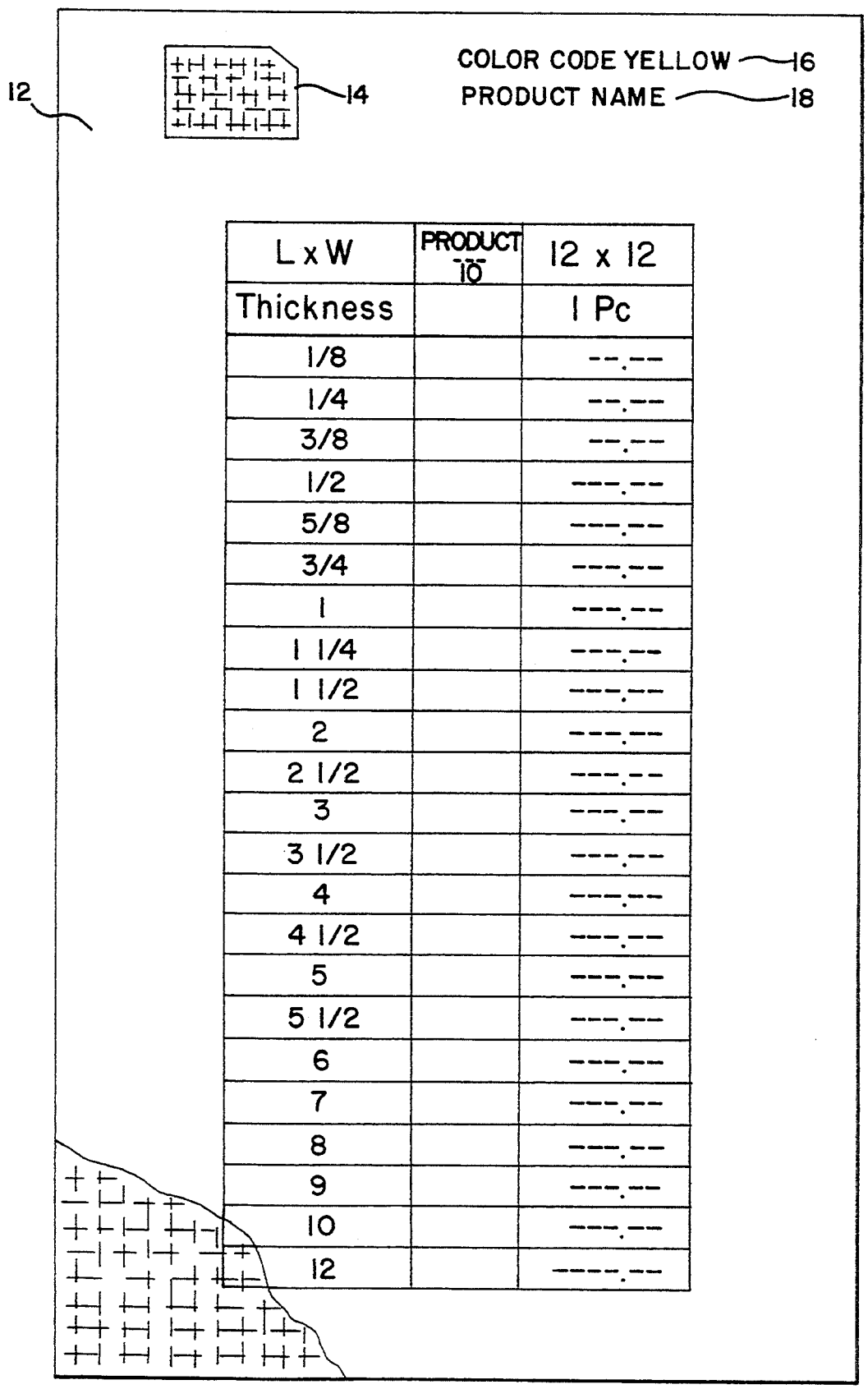
FIG. 1 is a diagrammatic view of the present system showing a plurality of color-coded generic items and a representation of the generic items, the surfaces also being color-coded.

Referring now to FIG. 1, the system of the invention is generally utilized in a parts ordering program or as an identification program for use of the parts. The system generally includes a series of colored pages 10 which in their totality comprise a manual or catalog. The catalog may be the loose-leaf type. Each page of the catalog bears a specific color as it relates to a specific class of items with which that page deals.

Figure 2:
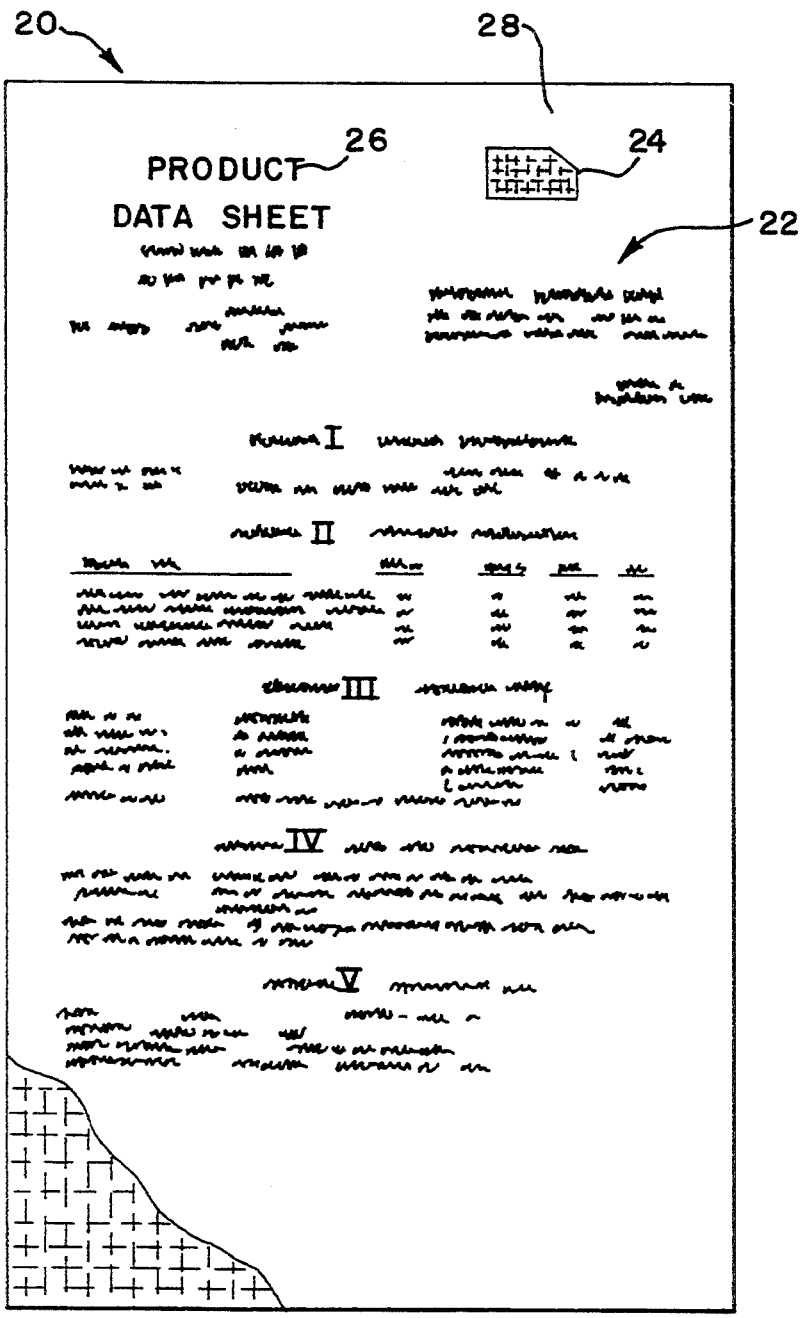
FIG. 2 is a diagrammatic view of a front side of a catalog page designed for use in the present system.
Figure 3:
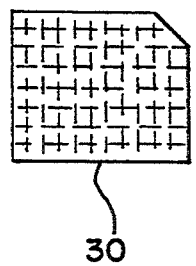
FIG. 3 is a diagrammatic view of the packaging of a specific item and the item, both being color-coded to match the catalog page.

The employees are instructed to associate the particular products 30 to be ordered or used (FIG. 3) with the corresponding pages of information 10 and 20 concerning the product in question. Each product has a tag, label, or packaging associated with it which is of a specified color, which color corresponds to the color of pages 10 and 20. Page 20 (FIG. 2) is a product specification sheet and describes the product with regard to its pertinent features in text 22. A depiction of the product 24 and the product name 26 are preferably included permanently on the face of the page.

On the front surface 12, the page 10 preferably includes a representation 14 of article 30. Also depicted on the front surface 12 is a statement 16 of the specific color used to represent the product 30 (i.e., the color of the page), as well as the product name 18. If desired, printed information regarding the product, its features, available sizes, and/or general information as to its makeup may also be included on the front surface 12.

Thus, the system of the subject invention may be used in a training method wherein illiterate, mentally handicapped and/or dyslexic workers may be instructed in the ordering or use of specific products without excessive verbal and/or written instructions. The workers are instructed to identify or associate the color of the order or specification page with the color of tag, label, or packaging associated with that object. Once the correct page is located via the color-coded method of the subject invention, the correct size of the specific item, or other listed parameter, may be ascertained and ordered. Also, the training may be continuously reinforced and the worker may be reminded, through the use of the set of pages during the ordering process and the color associated with that particular object and task. Although the present method has been illustrated and described in relation to an ordering process for certain objects, skilled practitioners will appreciate that it may be employed in other situations where such workers need to be trained for ordering or using parts in relatively simple tasks.

It should be realized that the method of the subject invention may include associating the colors with items which are separated into classes based on shape, size, manner of utilization, or the relationship of the respective items to each other.

While a particular embodiment of the present color-coded training method has been shown and described, it will be appreciated by those skilled in the art that changes and modifications may be made thereto without departing from the invention in its broader aspects and as set forth in the following claims.

What is claimed is:

1. A method of training an individual in the accurate ordering of specific items, each such item being of a generic class of items, the method comprising:

identifying each of said generic class of items with a different one of a plurality of different colors;

designating each of said items to be ordered with the one of said colors which identifies said generic class of items; and providing a catalog page for visually associating each of said colors with each of said corresponding generic class of items and each of said corresponding items so that an individual may associate a particular one of said colors with a particular one of said items as well as with a corresponding one of said generic class of items to learn the proper item for ordering purposes.

2. The method of claim 1 wherein said items are carbon plates.

3. The method of claim 1 wherein each catalog page bears one of said colors.

4. The method of claim 1 wherein said catalog pages includes printed information regarding said generic class of items.

5. A method of training an individual in the ordering of items from a manual comprising:

separating said items into classes based upon a feature selected from the group consisting of shape, size, utilization, and relationship to each other;

identifying each of said classes of items with a different one of a plurality of different colors;

designating each page of said manual referring to said items with one of said colors which identifies the class of items referred to on said page; and providing associating means for associating each of said colors with each of said corresponding classes of items and with each of said pages.

6. The method of claim 5 wherein said associating means is selected from the group consisting of tags, labels, and packaging.

7. The method of claim 6 wherein each page of said manual bears at least one of said colors, and includes diagrammatic representations of said corresponding class of items.

8. The method of claim 6 wherein at least one of said pages includes printed information regarding said classes of items.

9. A method of training an individual in the accurate ordering of specific items, each such item being of a generic class of items, the method comprising:

identifying each of said generic class of items with a different one of a plurality of different colors;

designating each of said items to be ordered with the one of said colors which identifies said generic class of items; and providing associating means, said associating means comprising a catalog page and including a representation of said generic class of items on said catalog page, and visually associating each of said colors with each of said corresponding generic class of items and each of said corresponding items so that an individual may associate a particular one of said colors with a particular one of said items as well as with a corresponding one of said generic class of items to learn the proper item for ordering purposes.

* * * * *